(12) United States Patent
Dixon et al.

(10) Patent No.: US 10,780,913 B2
(45) Date of Patent: Sep. 22, 2020

(54) METHOD OF CONTROLLING A MOTOR OF AN ELECTRIC POWER ASSISTED STEERING SYSTEM

(71) Applicant: TRW Limited, Solihull West Midlands (GB)

(72) Inventors: Christopher David Dixon, West Midlands (GB); Connel Brett Williams, Warwickshire (GB); Birk Junghanns, West Midlands (GB)

(73) Assignee: ZF Automotive UK Limited, Solihull, West Midlands ( * ) Notice: Subject to any disclaimer, the term of this patent is extended or adjusted under 35 U.S.C. 154(b) by 0 days.

(21) Appl. No.: 14/889,493

(22) PCT Filed: May 8, 2014

(86) PCT No.: PCT/GB2014/051401
§ 371 (c)(1),
(2) Date: Nov. 6, 2015

(87) PCT Pub. No.: WO2014/181109
PCT Pub. Date: Nov. 13, 2014

(65) Prior Publication Data
US 2016/0114830 A1  Apr. 28, 2016

(30) Foreign Application Priority Data
May 8, 2013 (GB) .................................. 1308249.0

(51) Int. Cl.
*B62D 5/04* (2006.01)
*H02P 29/024* (2016.01)

(52) U.S. Cl.
CPC .......... *B62D 5/0463* (2013.01); *B62D 5/046* (2013.01); *B62D 5/0484* (2013.01); *H02P 29/026* (2013.01)

(58) Field of Classification Search
CPC .... B62D 5/046; B62D 5/0481; B62D 5/0463; B62D 5/0484; B60W 10/06; B60W 10/08;
(Continued)

(56) References Cited

U.S. PATENT DOCUMENTS 4,751,978 A * 6/1988 Drutchas .............. B62D 5/0475
180/446
4,756,375 A * 7/1988 Ishikura ............... B62D 5/0463
180/404
(Continued)

FOREIGN PATENT DOCUMENTS

EP   2369736 A1   9/2011
GB   2177358 A    1/1987
(Continued)

OTHER PUBLICATIONS

Patent Act 1977: Search Report under Section 17(5), Application No. GB1308249.0 dated Oct. 29, 2013.
(Continued)

*Primary Examiner* — Genna M Mott
(74) *Attorney, Agent, or Firm* — Gigette M. Bejin

(57) ABSTRACT

A method of controlling a motor of an electric power assisted steering system, the motor having a plurality of phases, the method comprising taking as an input an input signal indicative of a desired assistance torque and determining from the desired assistance torque a voltage to be applied to each of the phases of the motor, in which the step of determining the voltage to be applied to each of the phases comprises limiting the voltage determined to be applied to each of the phases of the motor dependent upon the voltage provided by a power supply to the motor.

14 Claims, 5 Drawing Sheets

(58) Field of Classification Search
CPC .... B60W 10/26; B60W 20/106; B60W 20/12; B60W 20/20; B60W 2510/244; B60W 2520/10; B60W 2540/28; B60W 2540/30; B60W 2550/141; B60W 2710/244; H02P 29/026

See application file for complete search history.

(56) References Cited

U.S. PATENT DOCUMENTS

| | | | |
|---|---|---|---|
| 5,361,210 A | 11/1994 | Fu | |
| 9,065,375 B2 | 6/2015 | Yanai | |
| 2007/0199764 A1 | 8/2007 | Kifuku et al. | |
| 2008/0047776 A1 | 2/2008 | Kobayashi et al. | |
| 2009/0015182 A1* | 1/2009 | Kariatsumari | H02P 21/22 318/400.02 |
| 2009/0289498 A1* | 11/2009 | Hontani | B60R 16/03 307/10.1 |
| 2012/0139460 A1* | 6/2012 | Senkou | H02P 21/50 318/400.02 |
| 2012/0206075 A1* | 8/2012 | Kimpara | B62D 5/0424 318/400.15 |
| 2013/0026960 A1 | 1/2013 | Fujimoto et al. | |
| 2013/0033206 A1* | 2/2013 | Gallegos-Lopez | H02P 21/14 318/400.02 |
| 2014/0265954 A1* | 9/2014 | Kobayashi | B62D 5/046 318/400.02 |

FOREIGN PATENT DOCUMENTS

| | | |
|---|---|---|
| JP | 2006262669 | 9/2006 |
| JP | 2006262669 A | 9/2006 |
| JP | 2011125134 A | 6/2011 |
| WO | 2012/022970 A2 | 2/2012 |
| WO | 2012/022970 A3 | 2/2012 |
| WO | 2012124098 A1 | 7/2014 |

OTHER PUBLICATIONS

PCT International Search Report and the Written Opinion, Application No. PCT/GB2014/051401 filed May 8, 2014, dated Sep. 25, 2014.

European Examination Report, Application No. EP14731318, dated May 31, 2017.

* cited by examiner

METHOD OF CONTROLLING A MOTOR OF AN ELECTRIC POWER ASSISTED STEERING SYSTEM

CROSS-REFERENCE TO RELATED APPLICATIONS

This application is a national stage of International Application No. PCT/GB2014/051401, filed May 8, 2014, the disclosures of which are incorporated herein by reference in entirety, and which claimed priority to Great Britain Patent Application No. 1308249.0, filed May 8, 2013, the disclosures of which are incorporated herein by reference in entirety.

BACKGROUND OF THE INVENTION

This invention relates to a method of controlling a motor of an electric power assisted steering system and related apparatus.

It is known to provide an electrically power assisted steering (EPAS) system in which an electric motor applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

For accurate control of the motor torque it is essential to have control over the current applied to the motor. Typically a star connected three phase motor operated according to a Pulse width modulation control/drive strategy is used, each phase being connected to upper and lower drive stage switches connected to the battery supply and an earth respectively. In a PWM strategy each phase is driven with a cyclic PWM drive signal having a first state and a second state and a duty ratio indicative of the ratio of the time spent in each state in a cycle. The torque required from the motor is determined by a control circuit in terms of d-q axis motor current demand signals. These are then converted as required by a drive circuit into three phase currents in the static frame of reference, which requires knowledge of the motor rotor electrical angle of position. A position sensor may be provided that measures the rotor position or the system may be of the sensorless type, such as that taught in WO 2004/023639. Finally, using measurements of the actual current as feedback the pulse width modulation (PWM) duty cycles for each phase that are needed to produce the required actual average currents are calculated and used to drive the motor phases.

The motor draws current from the vehicles electrical supply, typically a battery which is topped up by an alternator that is driven by the drive train of the vehicle (either taking power from the engine or regenerative power during braking). The current drawn by the motor is a function of the battery voltage and the duty ratio of the drive signal applied to each phase.

At times where high assistance is required, the duty ratio of the switches will be high and the overall current drawn by the motor from the battery will in turn be high. For a healthy vehicle electrical system, the high current demand can generally be met by the alternator so the battery does not become depleted. The maximum current draw of the motor should be set to a level which can be met by the alternator. In the case where a sudden change from low assistance demand to high assistance demand occurs the alternator may not be able immediately to provide the current needed in which case some of the current will be drained from the battery until the alternator has had time to ramp up. If the battery is partially or fully depleted, or perhaps disconnected, the sudden increased demand for current may not be met, resulting in a drop in voltage until the alternator eventually responds, which only reacts to changes in battery voltage. This typically presents itself to the driver of the vehicle by dimming of the lights. In the worst case scenario, the voltage to critical parts of the engine could fall such that the engine itself stalls, possibly leading to a loss of control.

We have previously proposed, in our United Kingdom Patent Application No. 1218674.8 (incorporated herein by reference in entirety), restricting the rate of change of current demanded from such an EPAS system. Whilst this can at least partially ameliorate the problems of sudden changes in power demand from an EPAS system, we have found that, in certain circumstances, a sudden change in power demand can still result in a transient peak in the voltage demanded by such an EPAS system. The problems described above can therefore still occur, albeit less pronounced and for a shorter term than before.

BRIEF SUMMARY OF THE INVENTION

According to a first aspect of the invention, there is provided a method of controlling a motor of an electric power assisted steering system, the motor having a plurality of phases, the method comprising taking as an input an input signal indicative of a desired assistance torque and determining from the desired assistance torque a voltage to be applied to each of the phases of the motor, in which the step of determining the voltage to be applied to each of the phases comprises limiting the voltage determined to be applied to each of the phases of the motor dependent upon the voltage provided by a power supply to the motor.

As such, this method reduces the possibility of the motor being provided with such a large proportion of the voltage available from the power supply that the power supply cannot the demanded voltage, or that doing so would affect the operation of other circuits powered by the power supply circuit. We have appreciated that, instead of limiting the rate of change of current as we have previously proposed, the power consumed by the motor can be controlled by limiting the voltage provided to the motor, power being proportional to the product of current and voltage; limiting one of the factors in the product will limit the power consumed by the motor.

The power supply may comprise at least one of a vehicle alternator and a vehicle battery. The method is particularly useful where the power supply comprises both alternator and battery, but the battery has failed or has been disconnected. The present method can prevent the initial transient high voltage demand that can occur when the method we previously proposed of limiting the rate of change of current is employed. Furthermore, by not limiting the current, there is less restriction on the torque available from the system, as the torque provided by the motor is generally directly dependent on the motor current.

The step of limiting the voltage applied to each phase may comprise the step of determining a limit to the potential difference applied across each phase. The limit may be provided as a factor indicative of a maximum proportion of the voltage of the power supply. This factor may vary, typically linearly although not necessarily so, from a lower limit at a first voltage of the power supply to a higher limit at a second voltage of the power supply higher than the first voltage.

The method may comprise determining a maximum modulation depth, and applying the factor to the modulation depth to create a modified modulation depth which takes into account the limit on the voltages. The modulation depth indicates the maximum voltage difference that can be applied across a phase of the motor; the maximum voltage that can be applied to a phase is given by $½V_{PS}M$, where $V_{PS}$ is the voltage of the power supply, and M is the modulation index. For a star-wound motor, where the maximum voltage across one phase is two thirds of the power supply voltage, the modulation index will be ⅔. The modified modulation index can therefore be represented by $M_{mod}=fM$, where f is the factor, being not greater than unity. The limit on the voltage applied to each phase can therefore be depicted as:

$$\frac{1}{2}V_{PS}M_{mod} = \frac{1}{2}V_{PS}fM$$

Using the modulation index is convenient, because the algorithms already in use make use of the modulation index in determining the voltages to be applied to the phases.

The signal indicative of the desired assistance torque may represent a desired motor current. As such, the method may comprise determining the voltages to be applied to achieve such a current based upon the limit on the voltage to be applied to each phase.

The motor may be provided with a control circuit and a drive stage, the drive stage comprising switches arranged to switch the voltage from the power supply to the phases dependent as instructed by the control circuit. As such, the voltage provided by the power supply on the basis of which the limit on the voltages is determined may be the voltage provided to the drive stage.

The method of determining the voltages to be provided to each phase may comprise the step of determining a pulse width modulation (PWM) duty ratio to be applied to the voltage from the power supply, and providing a PWM voltage to each phase, the method then comprise determining the PWM ratios dependent upon the limit on voltage (and preferably upon the modified modulation index).

The method may also comprise limiting the voltage determined to be applied to each of the phases of the motor dependent upon a desired rate of change of the battery current. Typically, the voltage limit will be the minimum of a term dependent upon the voltage of the power supply and a term dependent upon the rate of change of battery current. The term dependent upon the rate of change of battery current may be determined in accordance with our United Kingdom Patent Application No. 1218674.8 (incorporated herein by reference in entirety), referred to therein as the gradient limit set point. Typically, the modified modulation index will be the minimum of a term dependent upon the voltage of the power supply and a term dependent upon the rate of change of battery current.

According to a second aspect of the invention, there is provided a control circuit for a motor, the motor having a plurality of phases, the control circuit comprising an input for a desired assistance torque and an output for a control signals to be applied to switches of a drive stage for the motor, the control circuit also having an input for a power supply voltage to be applied to the motor, the control circuit comprising a processor arranged to take the input signal indicative of a desired assistance torque and determining from the desired assistance torque a voltage to be applied to each of the phases of the motor and so provide the control signals, in which the processor determines the voltage to be applied to each of the phases by limiting the voltage determined to be applied to each of the phases of the motor dependent upon the power supply voltage.

The power supply may comprise at least one of a vehicle alternator and a vehicle battery. The method is particularly useful where the power supply comprises both alternator and battery, but the battery has failed or has been disconnected The processor may be arranged to generate the control signals so as to limit to the potential difference applied across each phase. The limit may be provided as a factor indicative of a maximum proportion of the voltage of the power supply. This factor may vary, typically linearly although not necessarily so, from a lower limit at a first voltage of the power supply to a higher limit at a second voltage of the power supply higher than the first voltage.

The processor may be arranged to determine a maximum modulation depth, and to apply the factor to the modulation depth to create a modified modulation depth which takes into account the limit on the voltages. The modulation depth indicates the maximum voltage difference that can be applied across a phase of the motor; the maximum voltage that can be applied to a phase is given by $½V_{PS}M$, where $V_{PS}$ is the voltage of the power supply, and M is the modulation index. For a star-wound motor, where the maximum voltage across one phase is two thirds of the power supply voltage, the modulation index will be ⅔. The modified modulation index can therefore be represented by $M_{mod}=fM$, where f is the factor, being not greater than unity. The limit on the voltage applied to each phase can therefore be depicted as:

$$\frac{1}{2}V_{PS}M_{mod} = \frac{1}{2}V_{PS}fM$$

Using the modulation index is convenient, because the algorithms already in use make use of the modulation index in determining the voltages to be applied to the phases.

The signal indicative of the desired assistance torque may represent a desired motor current. As such, the method may comprise determining the voltages to be applied to achieve such a current based upon the limit on the voltage to be applied to each phase.

The processor may be arranged to determine a pulse width modulation (PWM) duty ratio to be applied to the voltage from the power supply, and providing the control signals as PWM signals of switch on time and switch off time, the processor being arranged to determine the PWM ratios dependent upon the limit on voltage (and preferably upon the modified modulation index).

The processor may also be arranged to limit the voltage determined to be applied to each of the phases of the motor dependent upon a desired maximum rate of change of the battery current. Typically, the voltage limit will be the minimum of a term dependent upon the voltage of the power supply and a term dependent upon the rate of change of battery current. The term dependent upon the rate of change of battery current may be determined in accordance with our United Kingdom Patent Application No. 1218674.8 (incorporated herein by reference in entirety), referred to therein as the gradient limit set point. Typically, the modified modulation index will be the minimum of a term dependent upon the voltage of the power supply and a term dependent upon the rate of change of battery current.

According to a third aspect of the invention, there is provided a combination circuit comprising the control circuit of the second aspect of the invention and a drive stage for the motor, the drive stage comprising a plurality of switches arranged to switch the power supply voltage to the phases of the motor dependent upon the control signals from the control circuit.

According to a fourth aspect of the invention, there is provided a combination of a motor having a plurality of phases and the combination circuit of the third aspect of the invention, the switches being coupled to the phases of the motor.

According to a fifth aspect of the invention, there is provided an electric power assisted steering system, comprising a steering mechanism and the combination of the fourth aspect of the invention, the motor being coupled to the steering mechanism to provide an assistance torque.

Other advantages of this invention will become apparent to those skilled in the art from the following detailed description of the preferred embodiments, when read in light of the accompanying drawings.

DETAILED DESCRIPTION OF THE INVENTION

Figure 1:
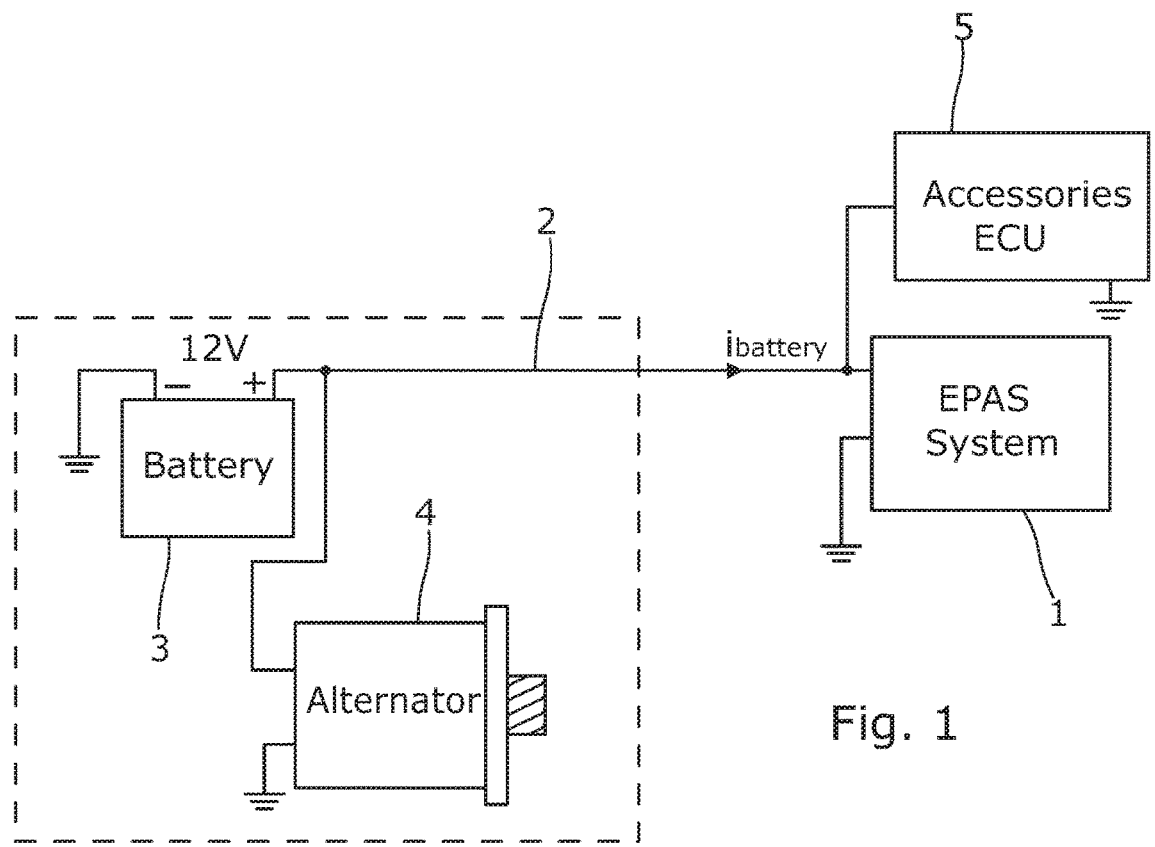
FIG. 1 is an overview of a part of a vehicle electrical system showing the connection of an electric power steering system the electrical supply.

As shown in FIG. 1 a vehicle is provided with an electric power assisted steering (EPAS) system that draws current $i_{battery}$ from the vehicle electrical supply across power rail 2. The supply comprises a battery 3, typically rated at 12 volts DC, which is in turn topped up by an alternator 4. The battery also provides current to other vehicle accessories 5.

Figure 2:
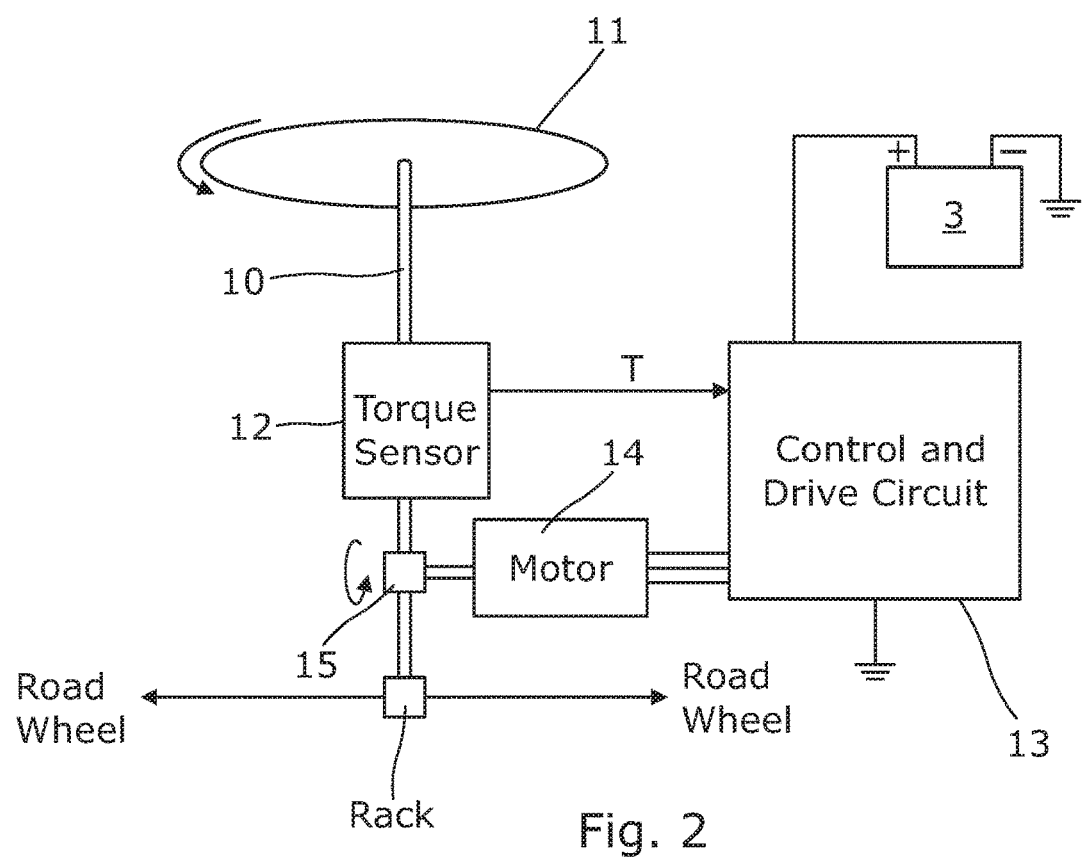
FIG. 2 is a schematic representation of the key parts of an exemplary electric power assisted steering (EPAS) system according to an embodiment of the invention.
Figure 3:
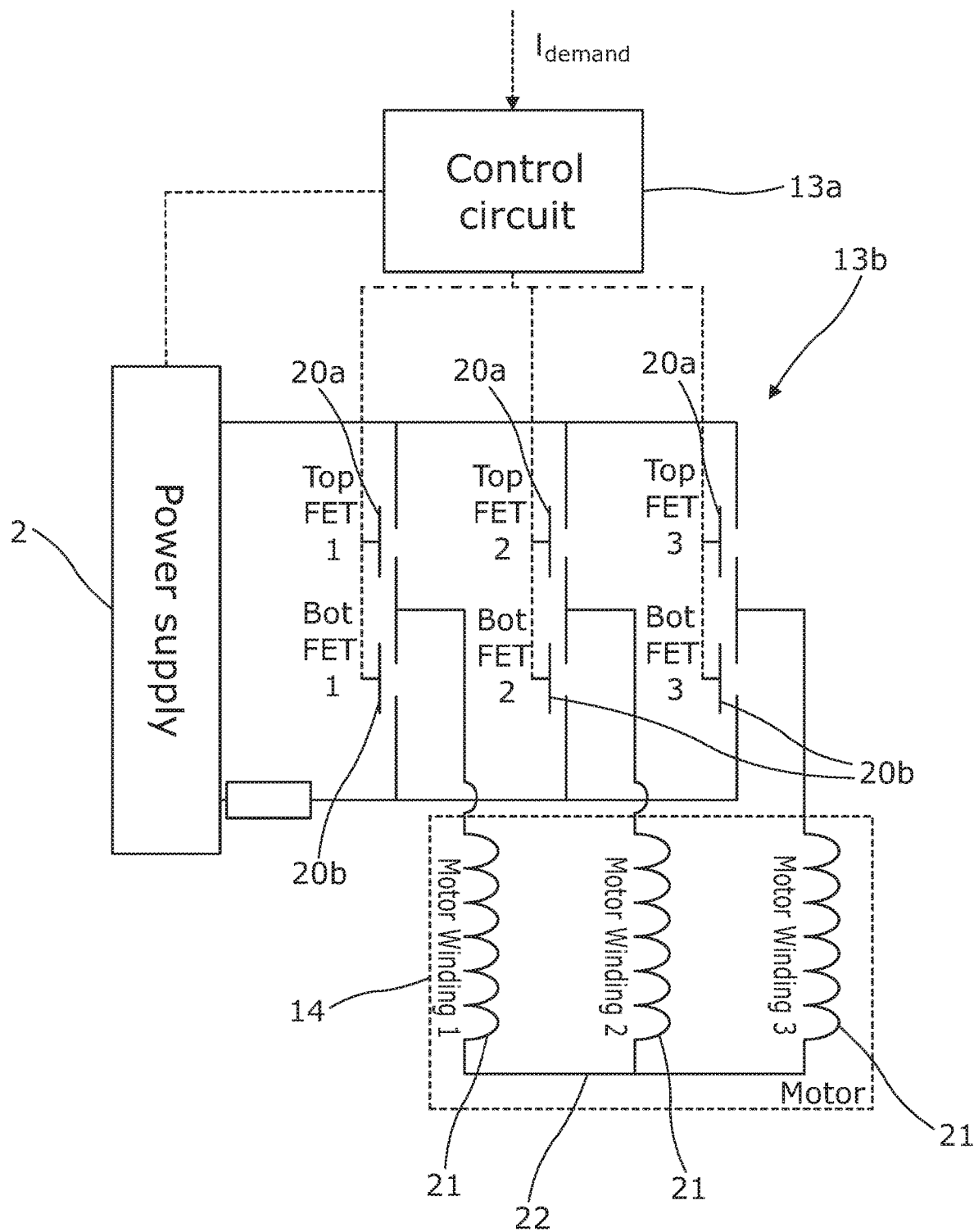
FIG. 3 is a diagram showing schematically the control circuit, drive stage and motor of the EPAS system of FIG. 2.

The EPAS system 1 is shown schematically in FIG. 2 of the drawings. It includes a steering column 10 attached to a steering wheel 11, a torque sensor 12 which measures the torque applied to the steering column 10 by the driver as they turn the steering wheel, a motor control and drive circuit 13 and an electric motor 14.

The torque sensor 12 may be attached to a quill shaft in series with the column 10, and the motor 14 may act upon the steering column or other part of the steering system, typically through a gearbox 15.

The motor 14 typically comprises a three phase wound stator element and a rotor having for example six embedded magnets within it which in this instance are arranged so as to provide six poles which alternate between north and south around the rotor. The rotor therefore defines three direct or d axes evenly spaced around the rotor and three quadrature or q axes interspaced between the d axes. The d axes are aligned with the magnetic poles of the magnets where the lines of magnetic flux from the rotor are in the radial direction, and the q axes are spaced between the d axes where the lines of magnetic flux from the rotor are in the tangential direction.

The three motor stator windings 21 are connected in a star network, with one end of each phase connected to a neutral point 22, and the others to the transistor bridge 20a, 20b for that phase. The drive circuit part 13b of the control and drive circuit 13 comprises a three phase bridge forming a switching stage. Each arm of the bridge comprises a pair of switches in the form of a top transistor 20a and a bottom transistor 20b connected in series between the battery supply rail 2 and ground line. The motor windings are each tapped off from between a respective complementary pair of transistors. The transistors are turned on and off in a controlled manner by a control and drive circuit to provide pulse width modulation (PWM) of the potential applied to each of the terminals, thereby to control the potential difference applied across each of the windings and hence also the current flowing through the windings which depends on the duty cycle d for each phase 21 of the motor. This in turn controls the strength and orientation of the magnetic field produced by the windings, and in turn the motor torque.

The torque signal output from the torque sensor 12 is fed to an input of the motor control means 13a of the control and drive circuit 13 which produces a set of motor current demand signals. The demand signals are in the form of two current demand signals in the d-q axis reference frame. The value of the d axis and q axis demand signals is dependent upon the measured torque and is set according to an assistance torque strategy. This can be implemented using a look up table perhaps stored in a memory of the control means which stores current demand signal values against torque signal values.

The drive circuit converts the d-q axis currents output from the control means into three current demand components in a static reference frame, one for each phase of the motor a, b or c. These demand currents are then converted by the drive circuit, in combination with an estimate of the rotor position, into suitable PWM signals that are supplied to the switching motor phases by PWM of the switches. A range of PWM switching strategies are known in the art and so will not be described in detail here. The switch arrangement is well known and described in such documents as EP 1083650A2, and is depicted generally in FIG. 4.

Both the control means part and drive circuit part of the control and drive circuit may be implemented using an electronic control unit running software that is stored in an area of memory.

Figure 4:
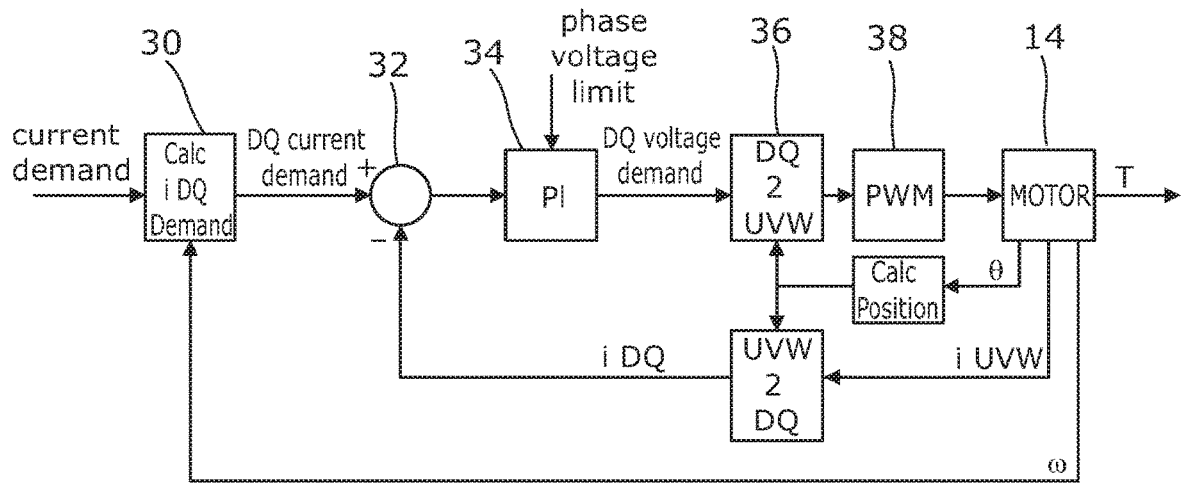
FIG. 4 is a flowchart showing the calculations carried out by the control circuit of FIG. 3.

In order to prevent an undesirably large voltage being drawn from the alternator 4 should the battery 3 be entirely depleted or even disconnected, the motor control circuit 13a can function as shown in FIG. 4 of the accompanying drawings. In this situation, the control signals generated by the motor are calculated in order to limit the voltage applied to each phase 21.

Taking the flowchart in FIG. 4 of the accompanying drawings, as discussed above determines a set of currents (step 30) along the d and q axes for each phase from the torque demand based upon the steering column torque. At step 32, these are compared with the actual currents flowing through those axes. At step 34, these are integrated in a proportional integrator (PI) circuit, whose output is the desired voltages (in the present case, along the d-q axes). However, a limit is applied in the PI circuit 34, which depends upon the voltage on the power rail 2.

This limit is calculated by modifying the modulation index used to calculate the desired voltages. The modulation index is used to determine the maximum voltage available to each phase. Typically, previously, the maximum voltage that could be applied to a given phase is $\frac{1}{2}V_{PS}M$, where $V_{PS}$ is the nominal voltage of the power supply (typically 12 volts in an automotive environment) and M is the modulation index. For a star-wound motor as in this embodiment, the maximum voltage available across one phase 21 is two thirds of the power supply voltage (representing the situation where the top transistor 20a is on and the bottom transistor 20b is off, and the top transistors 20a for the other two phases are off and the bottom transistors 20b are on), so M is $\frac{4}{3}$. However, a lower modulation index is usually used to prevent distortion in the generated signals; typically, around 1.15 is used.

By modifying the modulation index to be less than the previously used constant value, the maximum voltage applied to each phase can be reduced without affecting as badly the stall torque of the motor as if the current per phase was limited.

Figure 6:
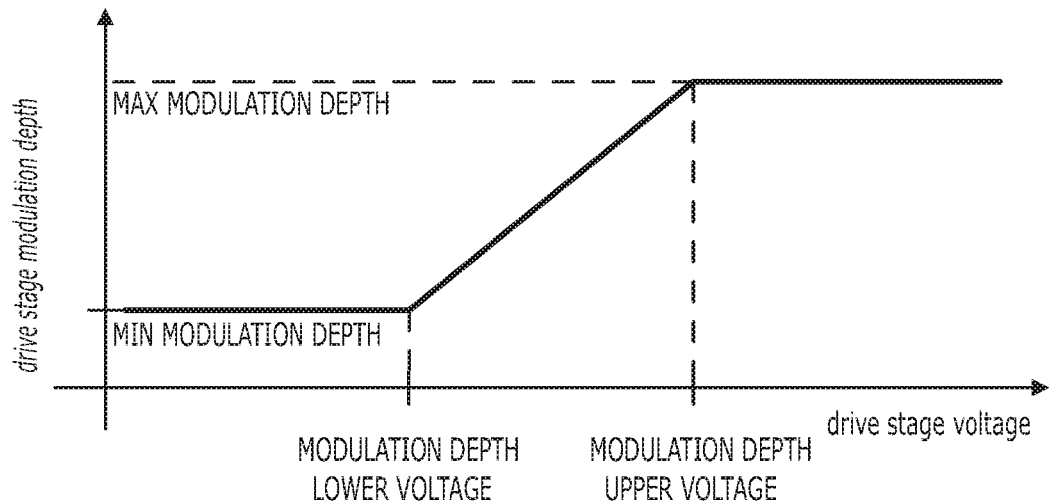
FIG. 6 is a graph showing the mapping which produces the first modified modulation index.

As such, two modulations indices are calculated. The first is determined from the voltage on the supply rail 2, which supplies the drive circuit 13b. An example map of the first modified modulation index used against the voltage on the supply rail 2 (shown as drive stage voltage) can be seen in FIG. 6 of the accompanying drawings. In this, the first modified modulation index is constant above an upper voltage MODULATION DEPTH UPPER VOLTAGE, and would take its customary value of (for this motor arrangement) say 1.15, depicted here as MAX MODULATION DEPTH. A typical value for MODULATION DEPTH UPPER VOLTAGE would be around 10 volts. Below a lower voltage threshold (MODULATION DEPTH LOWER VOLTAGE, say around 8 volts), the first modified modulation index would be a constant MIN MODULATION DEPTH, such that the system still attempts to provide some assistance even at low voltages. Between those voltages, the first modified modulation index changes linearly from the MIN MODULATION DEPTH to the MAX MODULATION DEPTH. However, it is envisaged that the variation could involve linear interpolation between several fixed points, or an entirely non linear variation.

Figure 7:
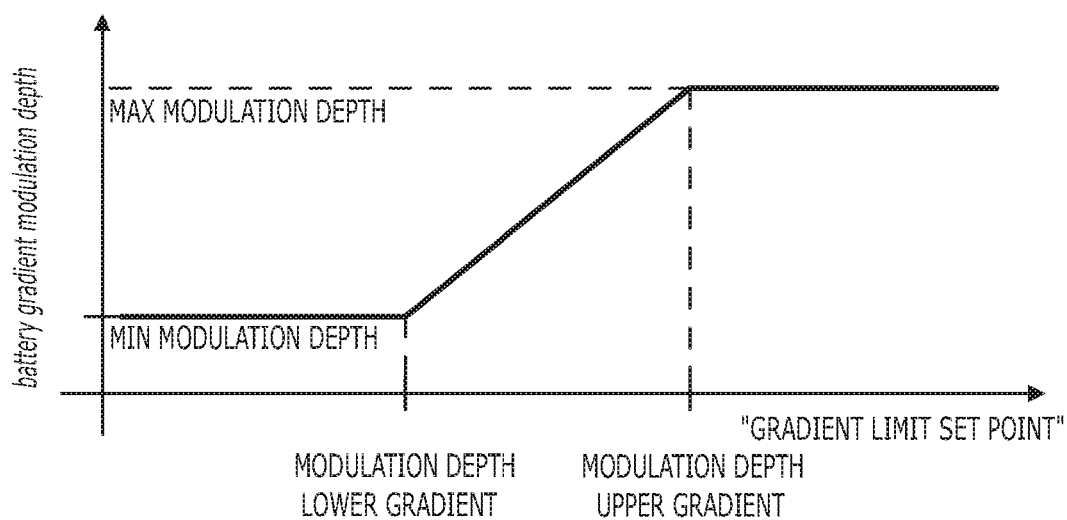
FIG. 7 is a graph showing the mapping which produces the second modified modulation index.

A second modified modulation index is calculated in accordance with the graph shown in FIG. 7 of the accompanying drawings. This uses the GRADIENT LIMIT SET POINT to modify the modulation index. The GRADIENT LIMIT SET POINT indicates the maximum desired rate of change of the current taken from the power supply rail 2, and is discussed in further detail in our United Kingdom Patent Application number 1218674.8 (incorporated herein by reference). In a similar vein to the first modified modulation index, the second modified modulation index is constant above an upper voltage MODULATION DEPTH UPPER GRADIENT, and would take its normal value of (for this motor arrangement) $\frac{4}{3}$, depicted here as MAX MODULATION DEPTH. Below a lower voltage threshold (MODULATION DEPTH LOWER GRADIENT), the first modified modulation index would be a constant MIN MODULATION DEPTH. Between those gradients, the first modified modulation index changes linearly from the MIN MODULATION DEPTH to the MAX MODULATION DEPTH. However, it is envisaged that the variation could involve linear interpolation between several fixed points, or an entirely non linear variation.

Figure 5:
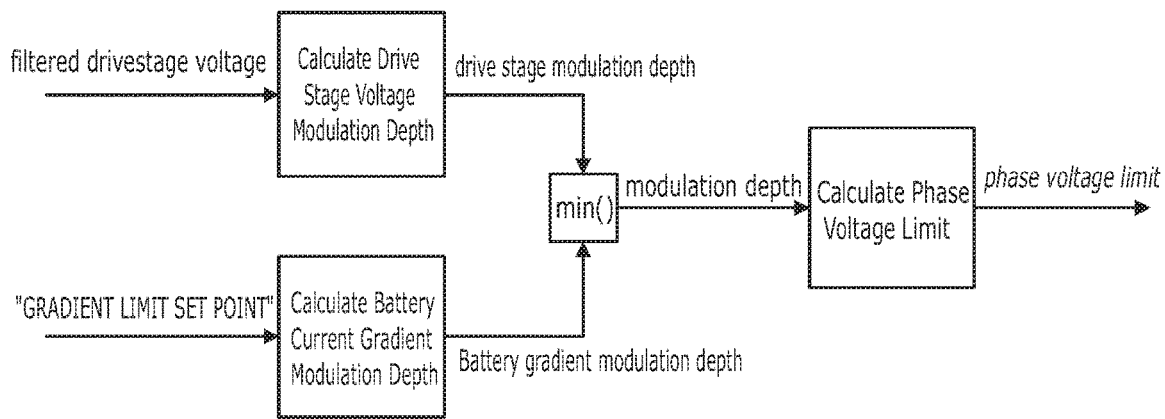
FIG. 5 is a further flowchart showing the calculation of the phase voltage limit by the control circuit of FIG. 3.
Figure 8:
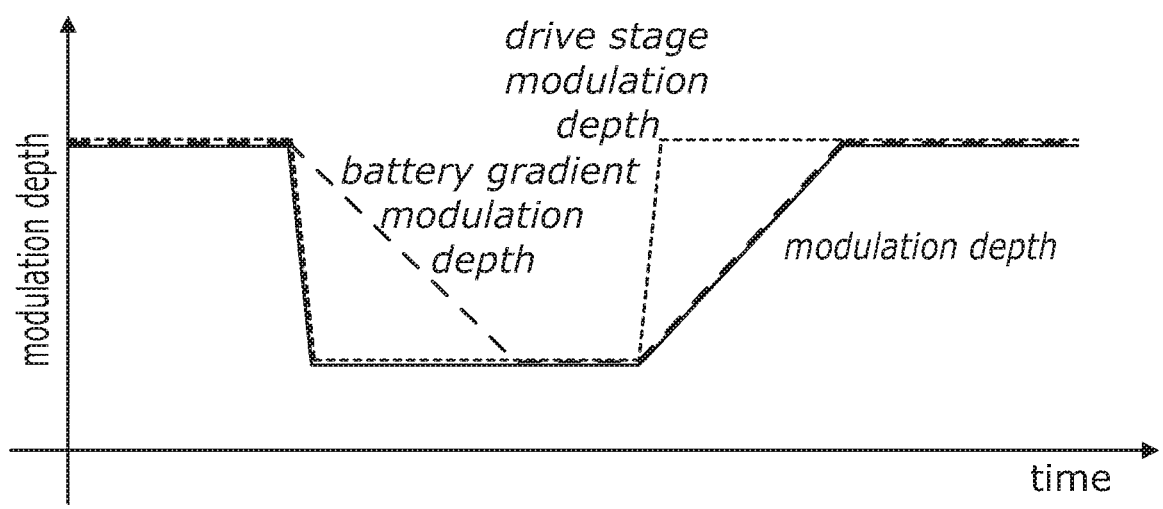
FIG. 8 is a graph showing the overall modified modulation index determined as a minimum of the first and second modulation indices shown in FIGS. 6 and 7.

The modified modulation index used is, as shown in FIG. 5 of the accompanying drawings, the minimum of the first and second modulation indices. This is depicted in FIG. 8 of the accompanying drawings, where the long dashed lines show the change of the first modified modulation index with time, the shorter dashed lines show the change of the second modified modulation index with time, and the solid line depicts the overall modified modulation index, following the lower of the two dashed lines. As can be see, using the overall modulation index follows the second modified modulation index as it exits the power limitation mode (where the modified modulation index is less than its maximum) more gentle than if it were merely following the first modified modulation index, and so allows for regulation of any adverse steering feel effects.

The modified modulation index is used to determine the maximum phase voltage (still using the nominal power supply voltage), which can then be used to calculate the demanded d-q axis voltages in the PI circuit 34.

These demand voltages are then converted to phase voltages in conversion step 36, and converted from phase voltages to a pulse width modulation ratio for each phase at step 38.

By providing the limitation on the phase voltage and so the power consumed by each phase, the power output is limited, reducing the strain placed on the alternator when the battery is not providing power (and therefore potentially allowing all the other electrical devices to operate correctly). The system is self regulating, reducing power output to the point where the battery voltage may recover. The fast transient response found with the scheme we previously proposed where rate of change of current was limited is achieved by limiting the power output of the motor. Other control schemes have been found to be not quick enough. The controlled exit condition from the power limitation mode allows good steer-feel to be maintained. A controlled exit condition (slowing the return to full power) maintains protection of the vehicle electrical system and provides more time for recovery. Further drops in voltage (which are likely with the vehicle operating in this state) would be less severe (as a gradient limit would be maintained); therefore subsequently the overall control of the vehicle is improved.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method of controlling a motor of an electric power assisted steering system, the motor having a plurality of phases, the method comprising the steps of:

taking as an input an input signal indicative of a desired assistance torque and determining from the desired assistance torque a transient lower voltage to be applied to each of the phases of the motor, in which the step of determining the transient lower voltage to be applied to each of the phases further comprises a step of multiplying ½ of the voltage provided by a power supply with a modified modulation index which progressively decreases based on a first modulation index model and which progressively increases based on a second modulation index model wherein the progressive decrease and progressive increase of the modified modulation index transiently adjusts the modified modulation index to a range of values which is less than 1.15; and applying the transient lower voltage to be applied to each of the phases of the motor.

2. The method of claim 1, in which the power supply comprises at least one of a vehicle alternator and a vehicle battery.

3. The method of claim 2, in which the power supply comprises both alternator and battery, but the battery has failed or has been disconnected.

4. The method of claim 1, in which a limit is provided as a factor indicative of a maximum proportion of the voltage of the power supply.

5. The method of claim 4, in which the factor varies from a lower limit at a first voltage of the power supply to a higher limit at a second voltage of the power supply higher than the first voltage.

6. The method of claim 4, comprising determining a maximum modulation depth, and applying the factor to the modulation depth to create a modified modulation depth which takes into account the limit on the voltages.

7. The method of claim 1, in which the signal indicative of the desired assistance torque represents a desired motor current.

8. The method of claim 1, in which the motor is provided with a control circuit and a drive stage, the drive stage comprising switches arranged to switch the voltage from the power supply to the phases as instructed by the control circuit, in which the voltage provided by the power supply on the basis of which a limit on the voltages is determined is the voltage provided to the drive stage.

9. The method of claim 1, comprising limiting the voltage determined to be applied to each of the phases of the motor dependent upon a desired maximum rate of change of a battery current.

10. The method of claim 9, in which a voltage limit is the minimum of a term dependent upon the voltage of the power supply and a term dependent upon the desired maximum rate of change of the battery current.

11. A control circuit for a motor, the motor having a plurality of phases, the control circuit comprising:
an input for a desired assistance torque and an output for control signals to be applied to switches of a drive stage for the motor;
an input for a power supply voltage to be applied to the motor, the control circuit comprising;
a processor arranged to take an input signal indicative of a desired assistance torque and determining from the desired assistance torque a transient lower voltage to be applied to each of the phases of the motor and so provide the control signals, in which the processor determines the transient lower voltage to be applied to each of the phases by multiplying ½ of the voltage provided by a power supply with a modified modulation index which progressively decreases based on a first modulation index model and which progressively increases based on a second modulation index model wherein the progressive decrease and progressive increase of the modified modulation index transiently adjusts the modified modulation index to a range of values which is less than 1.15; and applying the transient lower voltage to be applied to each of the phases of the motor.

12. A combination circuit comprising:
a control circuit for a motor having a plurality of phases, the control circuit further comprising:
an input for a desired assistance torque and an output for control signals to be applied to switches of a drive stage for the motor,
an input for a power supply voltage to be applied to the motor,
a processor arranged to take an input signal indicative of a desired assistance torque and determining from the desired assistance torque a transient lower voltage to be applied to each of the phases of the motor and so provide the control signals, in which the processor determines the transient lower to be applied to each of the phases by multiplying ½ of the voltage provided by the power supply with a modified modulation index which progressively decreases based on a first modulation index model and which progressively decreases and progressive increase of the modified modulation wherein the progressive decrease and progressive increase of the modified modulation index transiently adjusts the modified modulation index to a range of values which is less than 1.15; and applies the transient lower voltage to be applied to each of the phases of the motor; and
the drive stage for the motor, the drive stage comprising the plurality of switches arranged to switch the power supply voltage to the phases of the motor dependent upon the control circuit.

13. A combination of a motor having a plurality of phases and a combination circuit comprising:
a control circuit for a motor, the motor having a plurality of phases, the control circuit further comprising,
an input for a desired assistance torque;
an output for control signals to be applied to switches of a drive stage for the motor;
an input for a power supply voltage to be applied to the motor; and
a processor arranged to take an input signal indicative of a desired assistance torque and determining from the desired assistance torque;
a transient lower voltage to be applied to each of the phases of the motor and so provide the control signals, in which the processor determines the transient lower voltage to be applied to each of the phases by multiplying ½ of the voltage provided by the power supply with a modified modulation index which progressively decreases based on a first modulation index model and index which progressively increases based on a second modulation index model wherein the progressive decrease and progressive increase of the modified modulation index transiently adjusts the modified modulation index to a range of values which is less than 1.15 and applies the transient lower voltage to be applied to each of the phases of the motor; and
the drive stage for the motor, the drive stage comprising the plurality of switches arranged to switch the power supply voltage to the phases of the motor dependent upon the control signals from the control circuit, the switches being coupled to the phases of the motor.

14. An electric power assisted steering system, comprising:
a steering mechanism and a combination of a motor having a plurality of phases and a combination circuit further comprising:
a control circuit for the motor having the plurality of phases, the control circuit further comprising an input for a desired assistance torque, an output for control signals to be applied to switches of a drive stage for the motor, an input for a power supply voltage to be applied to the motor, a processor arranged to take an input signal indicative of a desired assistance torque and determining from the desired assistance torque a transient lower voltage to be applied to each of the phases of the motor and so provide the control signals, in which the processor determines the transient lower voltage to be applied to each of the phases by multiplying ½ of a voltage provided by the power supply with a modified modulation index which progressively decreases based on a first modulation index model and which progressively increases based on a second modulation index model wherein the progressive decrease and progressive increase of the modified modulation index transiently adjusts the modified modulation index to a range of values which is less than 1.15 thereby applying the transient lower voltage to each of the phases of the motor; and the drive stage for the motor, the drive stage comprising the plurality of switches arranged to switch the power supply voltage to the phases of the motor dependent upon the control signals from the control circuit, the switches being coupled to the phases of the motor, the motor being coupled to the steering mechanism to provide an assistance torque.

\* \* \* \* \*